United States Patent
Lin et al.

(10) Patent No.: US 11,846,729 B2
(45) Date of Patent: Dec. 19, 2023

(54) VIRTUAL REALITY POSITIONING DEVICE, VIRTUAL REALITY POSITIONING SYSTEM, AND MANUFACTURING METHOD OF VIRTUAL REALITY POSITIONING DEVICE

(71) Applicant: Acer Incorporated, New Taipei (TW)

(72) Inventors: Li Lin, New Taipei (TW); Ker-Wei Lin, New Taipei (TW); Chun-Ta Chen, New Taipei (TW); Chun-Yu Chen, New Taipei (TW); Hao-Ming Chang, New Taipei (TW); Chun-Hsien Chen, New Taipei (TW); Shih-Ting Huang, New Taipei (TW); Hui-Yen Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 436 days.

(21) Appl. No.: 17/219,904

(22) Filed: Apr. 1, 2021

(65) Prior Publication Data

US 2021/0318415 A1    Oct. 14, 2021

(30) Foreign Application Priority Data

Apr. 10, 2020 (TW) ................................ 109112107

(51) Int. Cl.
*G01S 7/481* (2006.01)
*G02B 27/01* (2006.01)
*G01S 7/497* (2006.01)
*G01S 17/06* (2006.01)

(52) U.S. Cl.
CPC .......... *G01S 7/4815* (2013.01); *G01S 7/4817* (2013.01); *G01S 7/4972* (2013.01); *G01S 17/06* (2013.01); *G02B 27/0179* (2013.01); *G02B 2027/0187* (2013.01)

(58) Field of Classification Search
None
See application file for complete search history.

(56) References Cited

U.S. PATENT DOCUMENTS

2019/0356848 A1* 11/2019 Rydberg ............... A63F 13/212

FOREIGN PATENT DOCUMENTS

| CN | 204359995 | 5/2015 |
|---|---|---|
| CN | 105164549 | 12/2015 |
| CN | 109643145 | 4/2019 |
| CN | 209895353 | 1/2020 |
| JP | H11218831 | 8/1999 |
| TW | I258583 | 7/2006 |
| TW | I297954 | 6/2008 |
| TW | I558988 | 11/2016 |
| TW | I565320 | 1/2017 |
| WO | 2019096986 | 5/2019 |
| WO | 2019143793 | 7/2019 |

* cited by examiner

*Primary Examiner* — Mark T Monk
(74) *Attorney, Agent, or Firm* — JCIPRNET

(57) ABSTRACT

A virtual reality positioning device including a casing, a plurality of lenses, and a plurality of optical positioning components is provided. The casing has a plurality of holes. The lenses are installed in the holes, respectively, where a field angle of each of the lenses is greater than or equal to 120 degrees and less than or equal to 160 degrees, and the lenses include convex lenses or Fresnel lenses. The optical positioning components are installed in the casing and aligned to the lenses, respectively. In addition, a virtual reality positioning system and manufacturing method of a virtual reality positioning device are provided.

16 Claims, 4 Drawing Sheets

VIRTUAL REALITY POSITIONING DEVICE, VIRTUAL REALITY POSITIONING SYSTEM, AND MANUFACTURING METHOD OF VIRTUAL REALITY POSITIONING DEVICE

CROSS-REFERENCE TO RELATED APPLICATION

This application claims the priority benefit of Taiwan patent application serial no. 109112107, filed on Apr. 10, 2020. The entirety of the above-mentioned patent application is hereby incorporated by reference herein and made a part of this specification.

BACKGROUND

Technical Field

The disclosure relates to a positioning device, a positioning system, and a manufacturing method of a positioning device; in particular, the disclosure relates to a virtual reality positioning device, a virtual reality positioning system, and a manufacturing method of a virtual reality positioning device.

Description of Related Art

Virtual reality is the use of computer technology to simulate a three-dimensional virtual environment to immerse a user in the three-dimensional virtual environment. Generally, the user is required to wear a head-mount display device to obtain an image corresponding to the three-dimensional virtual environment. To be specific, the user can interact with the virtual scene or people in the three-dimensional virtual environment. In order for the user to experience real-time interaction, it is necessary to track and locate the position and the direction of the dynamic user, so as to instantly adjust the images displayed in the head-mount display device.

At present, an optical tracking positioning technology has been applied to the virtual reality, such as a Lighthouse positioning technology or a Phase Space positioning technology. According to the Lighthouse positioning technology, for instance, the head-mounted display device worn by the user is equipped with a plurality of optical sensors, or the user holds or wears a joystick or a tracker, and the joystick or the tracker is equipped with a plurality of optical sensors. In another aspect, at least two light sources are disposed at the place where the user is located, and the two light sources are located at two opposite corners of the place. The two light sources scan the place where the user is located at a specific frequency, and the optical sensors are configured to sense the light emitted by the two light sources. According to the location of the optical sensors and the time at which each optical sensor receives the light, the relative location of the head-mount display device and the two light sources may be calculated subsequently. A light receiving angle of the existing optical sensors is small, which easily leads to inaccurate positioning or poor positioning efficiency. A common way to resolve the issue is to increase the number of optical sensors on the head-mount display device, the joystick, or the tracker, thus resulting in significant increase in the manufacturing costs.

SUMMARY

The disclosure provides a virtual reality positioning device, a virtual reality positioning system, and a manufacturing method of a virtual reality positioning device, which is conducive to improving positioning accuracy and positioning efficiency and reducing manufacturing costs.

In an embodiment of the disclosure, a virtual reality positioning device includes a casing, a plurality of lenses, and a plurality of optical positioning components. The casing has a plurality of holes. The lenses are installed in the holes, respectively, wherein a field angle of each of the lenses is greater than or equal to 120 degrees and less than or equal to 160 degrees, and the lenses include convex lenses or Fresnel lenses. The optical positioning components are disposed in the casing and aligned to the lenses, respectively.

In an embodiment of the disclosure, a virtual reality positioning system includes a first virtual reality positioning device and at least two second virtual reality positioning devices. The first virtual reality positioning device includes a casing, a plurality of lenses, and a plurality of first optical positioning components. The casing has a plurality of holes. The lenses are installed in the holes, respectively, wherein a field angle of each of the lenses is greater than or equal to 120 degrees and less than or equal to 160 degrees, and the lenses include convex lenses or Fresnel lenses. The first optical positioning components are disposed in the casing and aligned to the lenses, respectively. The at least two second virtual reality positioning devices are disposed on opposite sides of the first virtual reality positioning device, each of the second virtual reality positioning devices includes a second optical positioning component, and the second optical positioning component of each of the second virtual reality positioning devices is configured to be optically coupled to the first optical positioning components.

In an embodiment of the disclosure, a manufacturing method of a virtual reality positioning device includes following steps. A casing is provided, and the casing has a plurality of holes. A plurality of optical positioning components are installed in the casing and aligned to the holes. A plurality of lenses are installed in the holes, respectively. A field angle of each of the lenses is greater than or equal to 120 degrees and less than or equal to 160 degrees, and the lenses include convex lenses or Fresnel lenses.

In view of the above, the virtual reality positioning device provided in one or more embodiments of the disclosure adopts convex lenses or Fresnel lenses to increase the light receiving angle of the optical sensor, so as to improve positioning accuracy and positioning efficiency. Correspondingly, the virtual reality positioning system adopting the aforesaid virtual reality positioning device may also have good positioning accuracy and positioning efficiency. In another aspect, because the optical sensor has a relatively large light receiving angle, the number of the optical sensors disposed in the virtual reality positioning device and the number of holes disposed on the casing and corresponding to the optical sensors may be reduced, whereby the integrity of the appearance of the virtual reality positioning device may be enhanced, and the manufacturing costs may be reduced.

In order to make the above-mentioned and other features and advantages provided in the disclosure invention comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings

DESCRIPTION OF THE EMBODIMENTS

Figure 1:
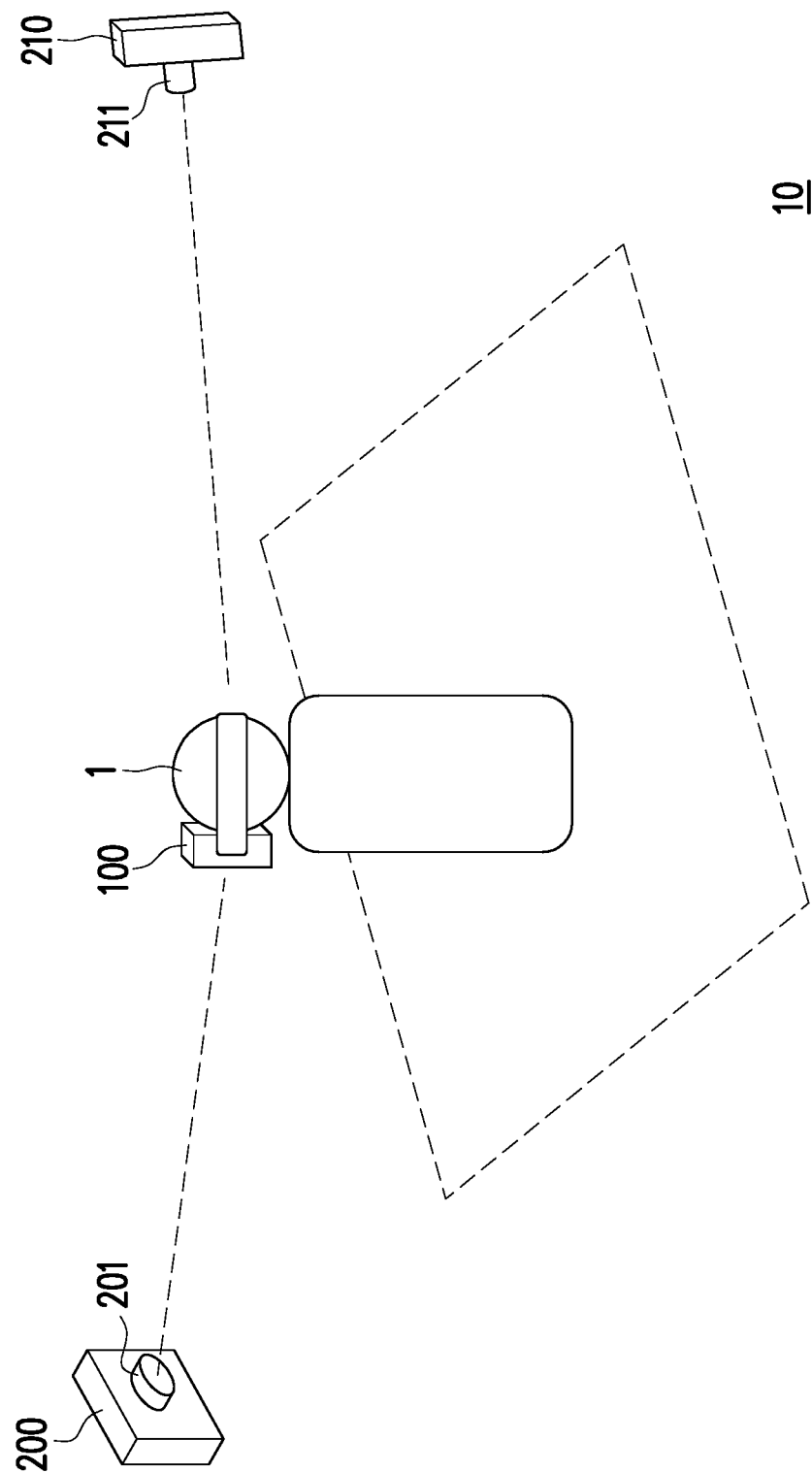
FIG. 1 is a schematic diagram of a virtual reality positioning system according to an embodiment of the disclosure.
Figure 2:
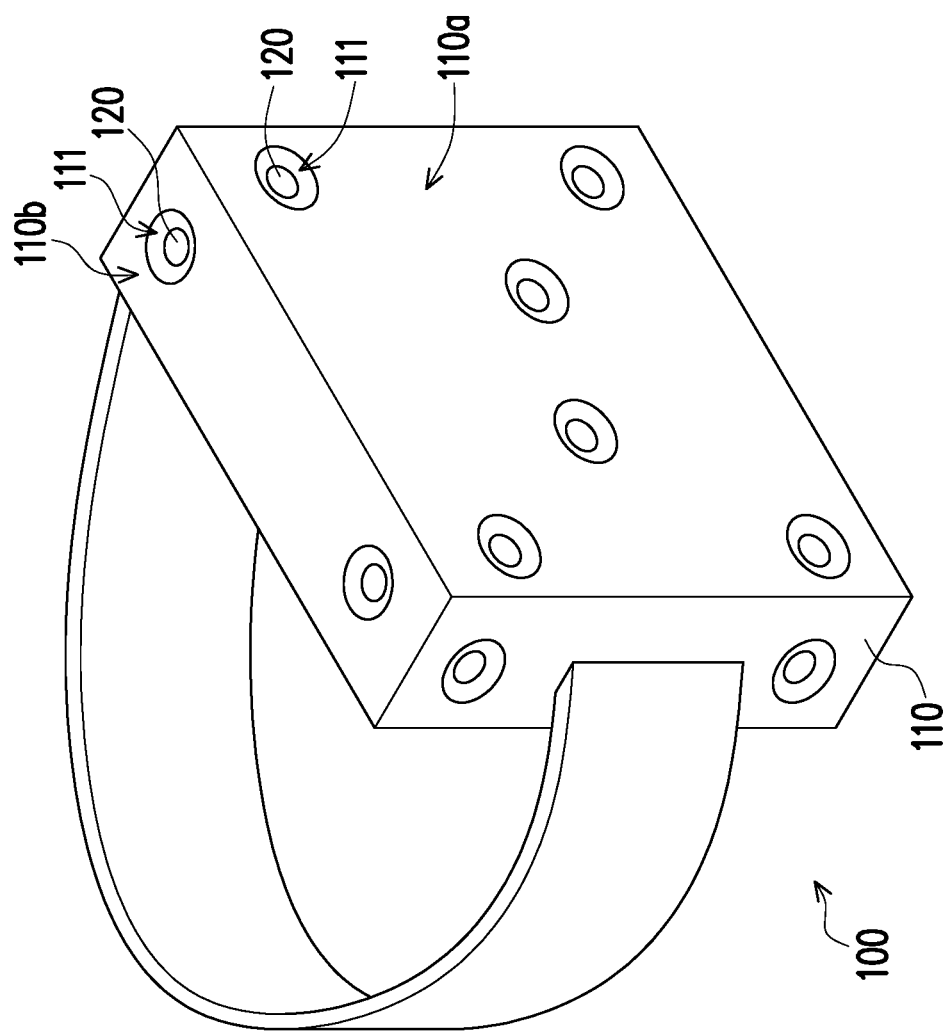
FIG. 2 is a schematic diagram of a virtual reality positioning device according to an embodiment of the disclosure.
Figure 3:
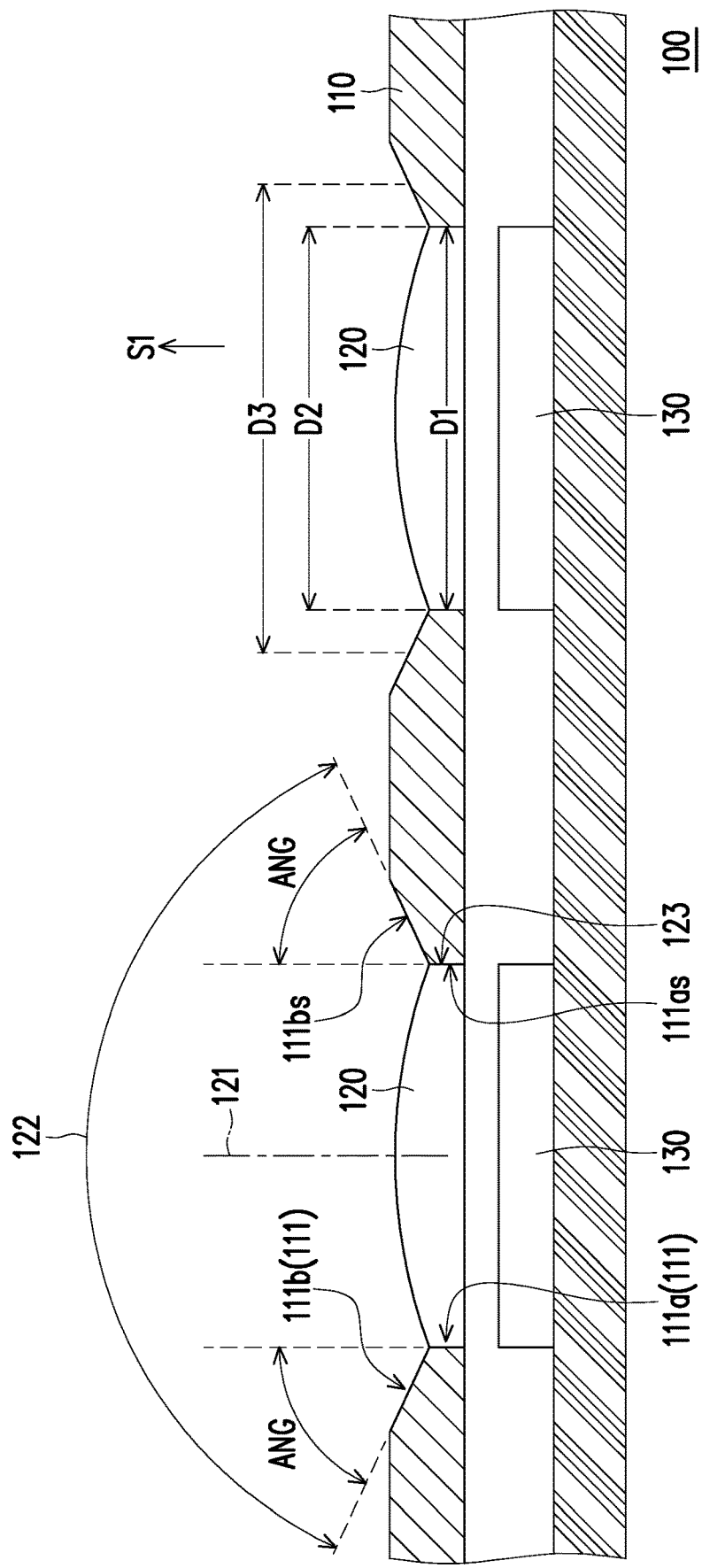
FIG. 3 is a schematic partial cross-sectional view of a virtual reality positioning device according to an embodiment of the disclosure.

FIG. 1 is a schematic diagram of a virtual reality positioning system according to an embodiment of the disclosure. FIG. 2 is a schematic diagram of a virtual reality positioning device according to an embodiment of the disclosure. FIG. 3 is a schematic partial cross-sectional view of a virtual reality positioning device according to an embodiment of the disclosure. With reference FIG. 1 to FIG. 3, in the embodiment, a virtual reality positioning system 10 adopts an optical tracking positioning technology, and the Lighthouse positioning technology is taken as an example, which should however not be construed as a limitation in the disclosure. In other words, the virtual reality positioning system 10 may also adopt the Phase Space positioning technology.

Specifically, the virtual reality positioning system 10 includes a first virtual reality positioning device 100 and at least two second virtual reality positioning devices 200, 210, the first virtual reality positioning device 100 may be a head-mounted display device worn by a user 1, or a joystick or a tracker held or worn by the user 1. In the embodiment, the head-mounted display device is applied for explanation, which should however not be construed as a limitation in the disclosure. In another aspect, the number of second virtual reality positioning devices 200 and 210 may increase according to actual needs. Here, the second virtual reality positioning devices 200 and 210 are disposed on opposite sides of the first virtual reality positioning device 100 and are located, for instance, diagonally at two opposite corners of a place where the user 1 is located.

The first virtual reality positioning device 100 includes a casing 110, a plurality of lenses 120, and a plurality of first optical positioning components 130. The casing 110 has a plurality of holes 111, and the number of the holes 111, the number of the lenses 120, and the number of the first optical positioning components 130 are equal. As to the manufacturing process, the first optical positioning components 130 are aligned to the holes 111, and then the first optical positioning components 130 are installed and positioned in the casing 110. In other words, the first optical positioning components 130 and the holes 111 are arranged in a one-on-one manner. The lenses 120 are installed in the holes 111, respectively, so that the first optical positioning components 130 are aligned to the lenses 120, respectively. In other words, the first optical positioning components 130 and the lenses 120 are arranged in a one-on-one manner. Hence, the manufacturing process of the first virtual reality positioning device 100 is quite convenient for production line personnel.

In a direction parallel to a primary optical axis 121 of the lenses 120, each first optical positioning component 130 and the corresponding lens 120 are overlapped. Further, the lenses 120 may be convex lenses, such as planar-convex lenses, and the first optical positioning components 130 may be optical sensors, such as photosensitive coupling components or complementary metal-oxide semiconductor (CMOS) semiconductor active pixel transducers. In another aspect, each of the second virtual reality positioning devices 200 and 210 includes a second optical positioning component 201, 211, and the second optical positioning component 201, 211 of each of the second virtual reality positioning devices 200 and 210 is configured to be optically coupled to the first optical positioning components 130. For instance, the second optical positioning components 201 and 211 may be light transmitters configured to project light to the place where the user 1 is located, and may perform scanning at a specific frequency. The first optical positioning components 130 are configured to sense the light emitted by the second optical positioning components 201, 211. According to the location of the first optical positioning components 130 and the time at which each of the first optical positioning components 130 receives the light, the relative location of the first virtual reality positioning device 100 and the user 1 may be calculated subsequently.

In the embodiment, a field angle 122 of each of the lenses 120 is greater than or equal to 120 degrees and less than or equal to 160 degrees, so that the light receiving angle of the first optical positioning components 130 may be increased to improve positioning accuracy and positioning efficiency. On the other hand, because the first optical positioning components 130 have the relatively large light receiving angle, the number of the first optical positioning components 130 and the number of holes 111 disposed on the casing 110 and corresponding to the first optical positioning components 130 in the first virtual reality positioning device 100 may be reduced, whereby the integrity of the appearance of the virtual reality positioning device 100 may be enhanced, and the manufacturing costs may be reduced.

In particular, if the virtual reality positioning system 10 adopts the Phase Space positioning technology, the first optical positioning components 130 may be optical transmitters, and the second optical positioning components 201, 211 may be optical sensors.

With reference to FIG. 2 and FIG. 3, in order to ensure the positioning accuracy, the casing 110 has at least two different surfaces, and the holes 111 are respectively located on different surfaces, respectively. For instance, the casing 110 may have a first surface 110a and a second surface 110b connected to each other, and normal vectors of the first surface 110a and the second surface 110b are not parallel to each other. The number of the holes 111 is required to be at least four, and at least one hole 111 is required to be located on the first surface 110a, while the other holes 111 may be located the second surface 110b, so as to ensure that the first optical positioning components 130 are able to sense the light coming from different directions.

In the embodiment, each of the holes 111 has a first hole portion 111a and a second hole portion 111b communicating with each other, and each of the lenses 120 is installed at the first hole portion 111a of one of the corresponding holes 111. An outer diameter D1 of each of the lenses 120 cooperates with an inner diameter D2 of the first hole portion 111a of the corresponding hole 111 to prevent the lenses 120 from falling from the casing 110. On the other hand, each second hole portion 111b is connected to the outer surface of the casing 110, and an inner diameter D3 of each second hole portion 111b is larger than the inner diameter D2 of the corresponding first hole portion 111a, thereby matching the field angle 122 of the corresponding lens 120.

Further, the inner diameter D3 of the second hole portion 111b of each of the holes 111 gradually increases in a direction S1 away from the first hole portion 111a, and an inner wall surface 111bs of the second hole portion 111b may be an inclined surface. On the other hand, an inner wall surface 111as of the first hole portion 111a of each of the holes 111 is connected to the inner wall surface 111bs of the corresponding second hole portion 111b, and the inner wall surface 111as of the first hole portion 111a may be parallel to the primary optical axis 121 of the corresponding lens 120. An edge 123 of each of the lenses 120 is connected to the inner wall surface 111as of the first hole portion 111a of the corresponding hole 111, an angle ANG between the edge 123 of each of the lenses 120 and the inner wall surface 111bs of the second hole portion 111b of the corresponding hole 111 is greater than or equal to 60 degrees and less than or equal to 80 degrees. In other words, the angle between the primary optical axis 121 of each of the lenses 120 and the inner wall surface 111bs of the second hole portion 111b of the corresponding hole 111 is also greater than or equal to 60 degrees and less than or equal to 80 degrees. Based on the design of the holes 111, it may be ensured that the first optical positioning components 130 have a relatively large light receiving angle.

Figure 4:
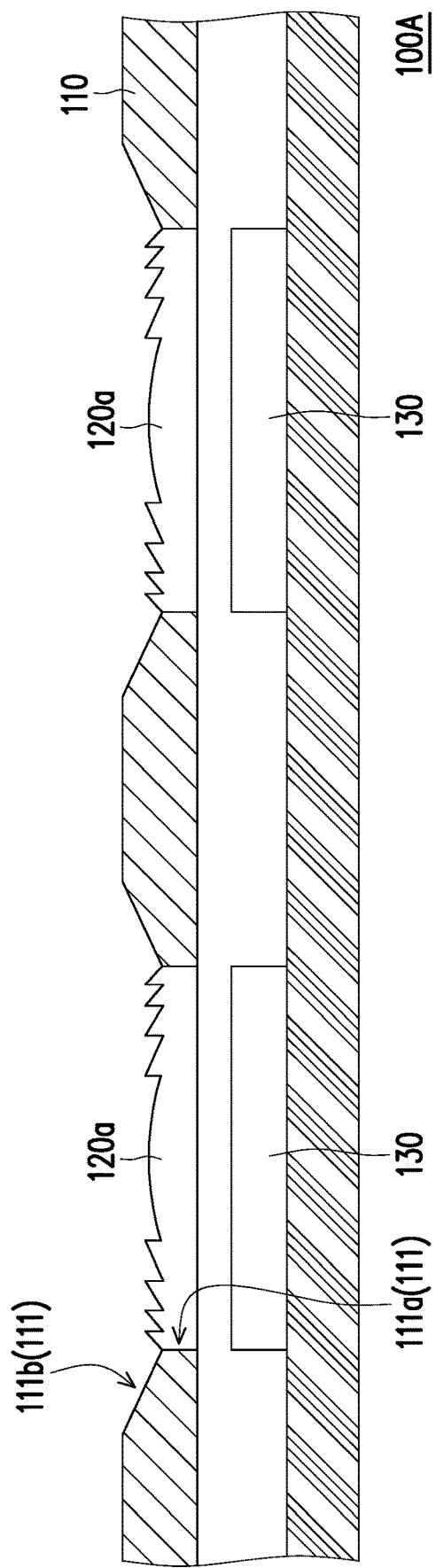
FIG. 4 is a schematic partial cross-sectional view of a virtual reality positioning device according to another embodiment of the disclosure.

FIG. 4 is a schematic partial cross-sectional view of a virtual reality positioning device according to another embodiment of the disclosure. With reference to FIG. 4, unlike the first virtual reality positioning device 100 provided in the previous embodiment, the first virtual reality positioning device 100A provided in the embodiment adopts the Fresnel lenses as the lenses 120a. The other design principles may be referred to as those provided in the description of the previous embodiment and thus will not be repeated hereinafter.

To sum up, the virtual reality positioning device provided in one or more embodiments of the disclosure adopts convex lenses or Fresnel lenses to increase the light receiving angle of the optical sensor, so as to improve the positioning accuracy and the positioning efficiency. Correspondingly, the virtual reality positioning system adopting the aforesaid virtual reality positioning device may also have good positioning accuracy and positioning efficiency. In another aspect, because the optical sensor has a relatively large light receiving angle, the number of the optical sensors disposed in the virtual reality positioning device and the number of holes disposed on the casing and corresponding to the optical sensors may be reduced, whereby the integrity of the appearance of the virtual reality positioning device may be enhanced, and the manufacturing costs may be reduced.

Although the disclosure has been described with reference to the above embodiments, it will be apparent to one of ordinary skill in the art that modifications to the described embodiments may be made without departing from the spirit of the disclosure. Accordingly, the scope provided in the disclosure is defined by the attached claims not by the above detailed descriptions.

What is claimed is:

1. A virtual reality positioning device, comprising:
a casing, having a plurality of holes;
a plurality of lenses, installed in the holes respectively, wherein a field angle of each of the lenses is greater than or equal to 120 degrees and less than or equal to 160 degrees, and the lenses comprise convex lenses or Fresnel lenses;
and a plurality of optical positioning components sensing emitted light, installed in the casing and respectively aligned to the lenses.

2. The virtual reality positioning device according to claim 1, wherein each of the holes has a first hole portion and a second hole portion connected to each other, each of the lenses is installed at the first hole portion of a corresponding hole of the holes, and an inner diameter of the second hole portion of each of the holes is larger than an inner diameter of the first hole portion of each of the holes.

3. The virtual reality positioning device according to claim 2, wherein the inner diameter of the second hole portion of each of the holes gradually increases in a direction away from the first hole portion.

4. The virtual reality positioning device according to claim 2, wherein the first hole portion of each of the holes has a first inner wall surface, the second hole portion of each of the holes has a second inner wall surface connecting the corresponding first inner wall surface of the first hole portion, an edge of each of the lenses is connected to the first inner wall surface of the first hole portion of a corresponding hole of the holes, and an angle between the edge of each of the lenses and the second inner wall surface of the second hole portion of a corresponding hole of the holes is greater than or equal to 60 degrees and less than or equal to 80 degrees.

5. The virtual reality positioning device according to claim 4, wherein the second inner wall surface of the second hole portion of each of the holes is an inclined surface.

6. The virtual reality positioning device according to claim 1, wherein each of the optical positioning components comprises an optical sensor or an optical transmitter.

7. The virtual reality positioning device according to claim 1, wherein the casing has at least two different surfaces, and the holes are located on the at least two surfaces, respectively.

8. A virtual reality positioning system, comprising:
a first virtual reality positioning device, comprising:
a casing, having a plurality of holes;
a plurality of lenses, installed in the holes respectively, wherein a field angle of each of the lenses is greater than or equal to 120 degrees and less than or equal to 160 degrees, and the lenses comprise convex lenses or Fresnel lenses; and
a plurality of first optical positioning components, installed in the casing and aligned to the lenses, respectively; and
at least two second virtual reality positioning devices, arranged on opposite sides of the first virtual reality positioning device, wherein each of the second virtual reality positioning devices comprises a second optical positioning component, and the second optical positioning component of each of the second virtual reality positioning devices is configured to be optically coupled to the first optical positioning components.

9. The virtual reality positioning system according to claim 8, wherein each of the holes has a first hole portion and a second hole portion connected to each other, each of the lenses is installed at the first hole portion of a corresponding hole of the holes, and an inner diameter of the second hole portion of each of the holes is larger than an inner diameter of the first hole portion of each of the holes.

10. The virtual reality positioning system according to claim 9, wherein the inner diameter of the second hole portion of each of the holes gradually increases in a direction away from the first hole portion.

11. The virtual reality positioning system according to claim 9, wherein the first hole portion of each of the holes has a first inner wall surface, the second hole portion of each of the holes has a second inner wall surface connecting the corresponding first inner wall surface of the first hole portion, an edge of each of the lenses is connected to the first inner wall surface of the first hole portion of a corresponding hole of the holes, and an angle between the edge of each of the lenses and the second inner wall surface of the second hole portion of a corresponding hole of the holes is greater than or equal to 60 degrees and less than or equal to 80 degrees.

12. The virtual reality positioning system according to claim 11, the second inner wall surface of the second hole portion of each of the holes is an inclined surface.

13. The virtual reality positioning system according to claim 8, wherein each of the first optical positioning components comprises an optical sensor or an optical transmitter.

14. The virtual reality positioning system according to claim 8, wherein each of the second optical positioning components comprises an optical sensor or an optical transmitter.

15. The virtual reality positioning system according to claim 8, wherein the casing has at least two different surfaces, and the holes are located on the at least two surfaces, respectively.

16. A manufacturing method of a virtual reality positioning device, comprising:
provide a casing, the casing having a plurality of holes;
respectively aligning a plurality of optical positioning components to the holes and installing the optical positioning components sensing emitted light in the casing; and
respectively installing a plurality of lenses in the holes, wherein a field angle of each of the lenses is greater than or equal to 120 degrees and less than or equal to 160 degrees, and the lenses comprise convex lenses or Fresnel lenses.

* * * * *